(12) United States Patent
Moroda

(10) Patent No.: US 12,106,700 B2
(45) Date of Patent: Oct. 1, 2024

(54) IMAGE PROCESSING APPARATUS FOR DETERMINING USAGE OF EXTERNAL DEVICE, IMAGE PROCESSING METHOD, AND STORAGE MEDIUM

(71) Applicant: CANON KABUSHIKI KAISHA, Tokyo (JP)

(72) Inventor: Hajime Moroda, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/326,236

(22) Filed: May 31, 2023

(65) Prior Publication Data

US 2023/0395013 A1    Dec. 7, 2023

(30) Foreign Application Priority Data

Jun. 2, 2022  (JP) ................................ 2022-090359

(51) Int. Cl.
  *G09G 3/22*      (2006.01)
  *G06F 3/14*      (2006.01)
  *G09G 5/377*     (2006.01)

(52) U.S. Cl.
  CPC ............... *G09G 3/22* (2013.01); *G06F 3/14* (2013.01); *G09G 5/377* (2013.01); *G09G 2320/0626* (2013.01); *G09G 2320/0666* (2013.01)

(58) Field of Classification Search
  CPC ...................................... G09G 3/22
  USPC ........................................ 345/690
  See application file for complete search history.

(56) References Cited

U.S. PATENT DOCUMENTS

| | | | |
|---|---|---|---|
| 7,209,187 B2 | 4/2007 | Mears et al. | |
| 2015/0296599 A1* | 10/2015 | Recker | H05B 47/11 |
| | | | 315/153 |
| 2020/0067341 A1* | 2/2020 | Glover | H02J 50/80 |

(Continued)

FOREIGN PATENT DOCUMENTS

| | | |
|---|---|---|
| JP | 2002-354363 A | 12/2002 |
| JP | 6055421 B2 | 12/2016 |

*Primary Examiner* — Long D Pham
(74) *Attorney, Agent, or Firm* — Cowan, Liebowitz & Latman, P.C.

(57) ABSTRACT

An image processing apparatus that is able to prevent negative influence caused by an illuminating unit of an external device emitting light or flashing when specifying the external device, wherein the image processing apparatus includes a control unit configured to control a display screen that performs superimposed display of information relating to an external device on a video image including the external device that has been captured by an image capturing unit; and determining unit configured to determine whether the illuminating unit of the external device is in use or not, or whether an image recognition operation based on the video image is in progress or not, wherein when an instruction to make an illuminating unit of the external device light up or flash has been input, in a case in which determining unit determines that the illuminating unit of the external device is in use, or an image recognition operation based on the video image is in progress, the control unit displays a screen for displaying predetermined specifying information in the vicinity of the external device on the display screen instead of making the illuminating unit light up or flash.

24 Claims, 10 Drawing Sheets

(56) References Cited

U.S. PATENT DOCUMENTS

2020/0322178 A1* 10/2020 Wang .................... H04W 4/021
2022/0101802 A1    3/2022 Kondo et al.

* cited by examiner

IMAGE PROCESSING APPARATUS FOR DETERMINING USAGE OF EXTERNAL DEVICE, IMAGE PROCESSING METHOD, AND STORAGE MEDIUM

BACKGROUND OF THE INVENTION

Field of the Invention

The present invention relates to an image processing apparatus, an image processing method, a storage medium, and the like.

Conventionally, image processing apparatuses such as monitoring apparatuses and the like are known that are able monitor video images and acquire audio by control through remote operations via a network or a leased line. In these monitoring apparatuses, it is possible to acquire and control information by connection with an external device. In addition, the external device is generally provided with an LED (light emitting diode) that serves as an indicator, and for example, specifying the external device, or the like is performed by lighting up the indicator.

In Japanese Patent No. 6055421, a display apparatus is disclosed in which, in a case in which the display apparatus has itself been selected as the communication partner from the side of a different image display apparatus, the display apparatus makes an indicator provided in the vicinity of the device's own image display unit light up at a predetermined brightness.

In Japanese Unexamined Patent Application, First Publication No. 2002-354363, when the power for a video apparatus is turned on, a system provided with a user interface that selectively lights up the illumination of its power indicator is opened.

In contrast, in a case in which an electric light type external device is controlled via a network or the like, there are cases in which the electric light itself is also given the role of serving as the indicator. In such cases, it is possible that upon instructing the indicator to light up or flash, there is a concern that the electric light lighting up or flashing will affect the surrounding lighting environment.

The present invention was created taking into consideration problems such as that described above, and one of its goals is to provide an image processing apparatus, or the like in which it is possible to prevent the negative effects caused by the illuminating unit of an external device emitting light or flashing when specifying the external device.

SUMMARY OF THE INVENTION

An image processing apparatus according to one aspect of the present invention comprises at least one processor or circuit configured to function as: a control unit configured to control a display screen that displays a superimposed display of information relating to an external device on a video image including the external device that has been captured by an image capturing unit, and determining unit configured to determine whether the illuminating unit of the external device is in use or not, or whether an image recognition operation based on the video image is in progress or not, wherein when an instruction to make an illuminating unit of the external device light up or flash has been input, in a case in which determining unit determines that the illuminating unit of the external device is in use, or an image recognition operation based on the video image is in progress, the control unit displays a screen for displaying predetermined specifying information in the vicinity of the external device on the display screen instead of making the illuminating unit light up or flash.

Further features of the present invention will become apparent from the following description of embodiments with reference to the attached drawings.

DESCRIPTION OF THE EMBODIMENTS

Hereinafter, with reference to the accompanying drawings, favorable modes of the present invention will be described using Embodiments. In each diagram, the same reference signs are applied to the same members or elements, and duplicate descriptions will be omitted or simplified.

First Embodiment

Figure 1:
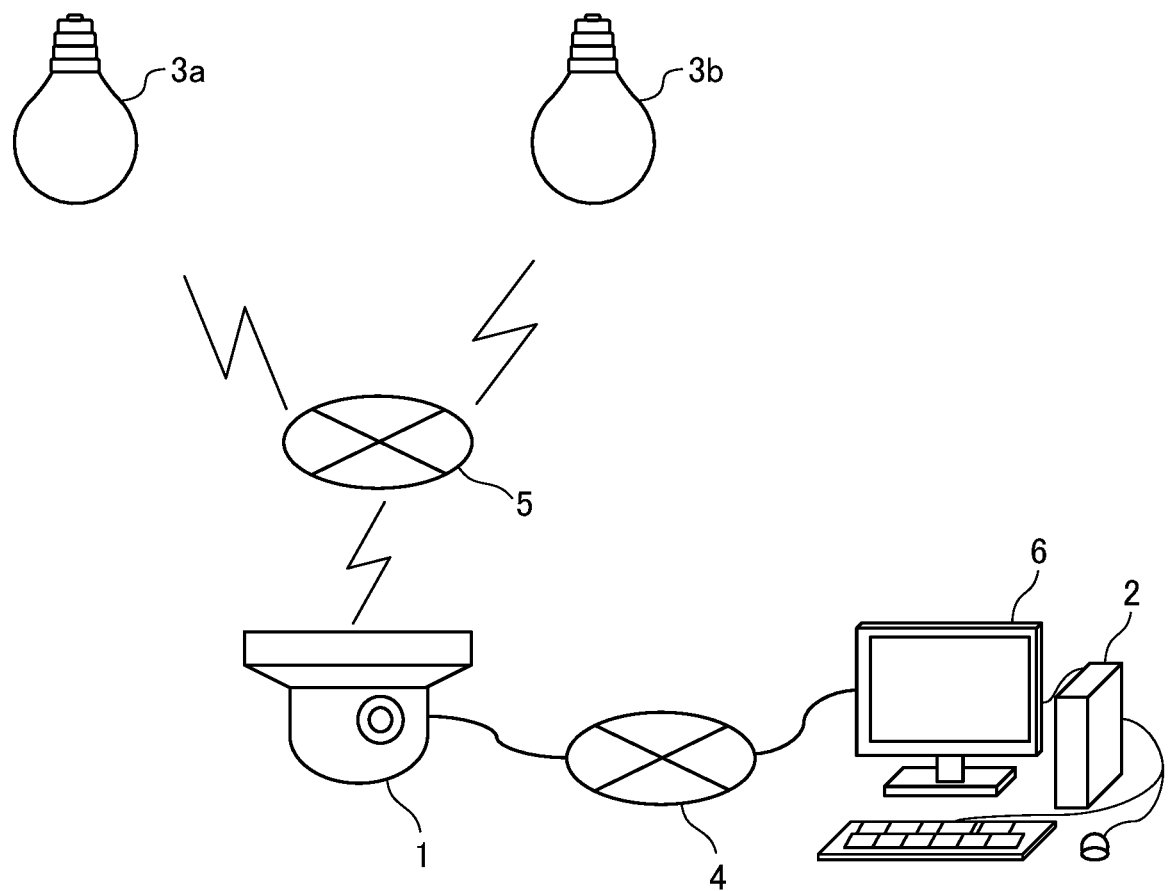
FIG. 1 is a diagram showing one example of a configuration of a monitoring system 10 in a First Embodiment.

FIG. 1 is a diagram showing one example of a configuration of a monitoring system 10 according to a First Embodiment. The monitoring system 10 of the present embodiment is provided with a monitoring apparatus 1, a client apparatus 2, external devices 3a, and 3b, and the like. In the present embodiment, for example, the monitoring apparatus 1, and the client apparatus 2 function as image processing apparatuses.

The monitoring apparatus 1 is a monitoring camera that captures images of subjects such as people or the like in video images, and, for example, is able to use a network camera. The monitoring apparatus 1 performs communications with the client apparatus 2, and the external devices 3a, and 3b via networks 4, and 5.

The client apparatus 2 is an apparatus for controlling the operations of the monitoring apparatus 1, and, for example, is able to use an information processing device such as a PC (personal computer), or the like. Note that the client apparatus 2 has a display unit 6, and functions as a display control apparatus that controls the display unit 6. In addition, the client apparatus 2 transmits each type of control command to the monitoring apparatus 1.

Control commands include, for example, operation (light up, and the like) instructions for the external devices 3a, and 3b, and the like, light up or flash instructions for the indicator in order to specify (confirm) the external devices 3a, and 3b, commands for setting image detection, performing control, and the like of the monitoring apparatus 1, and the like. Note that the monitoring apparatus 1 transmits responses to the control commands that have been received to the client apparatus 2.

The external devices 3a, and 3b perform communications with the monitoring apparatus 1 via the network 5. The monitoring apparatus 1 transmits control commands to the external devices 3a, and 3b, and receives notification commands from the external devices 3a, and 3b relating to the status of the devices.

In the present embodiment, the external devices 3a, and 3b are electric light type devices, and are configured so as to make the indicator provided on the housing of the external device light up or flash by operating an electronic circuit in response to externally received control commands.

Note that in the present embodiment, the indicator may be an illuminating unit such as an LED or the like, or the electric light itself may also be used as the indicator. In this context, the indicator and electric light function as an illuminating unit.

In addition, the external devices 3a, and 3b transmit notification commands to the monitoring apparatus 1 that notify the monitoring apparatus 1 of their current state (for example, current values such as the brightness of the electric light, or the like). Note that the functions held by the external devices 3a, and 3b are not limited to electric light functions, and for example, the external devices 3a, and 3b may also be devices having other functions such as various types of sensor device.

The monitoring apparatus 1 and the client apparatus 2 are connected in a state in which they can communicate with each other via the network 4. The network 4 is configured by, for example, a plurality of routers, switches, cables, and the like that fulfill a communication standard such as Ethernet (registered trademark), or the like. However, any communication standard, scale, and confirmation may also be used if communication between the monitoring apparatus 1 and the client apparatus 2 is possible.

The monitoring apparatus 1 and the external devices 3a, and 3b are connected in a state in which they are able to communicate with each other via the wireless or wired network 5. The network 5 can use, for example, a network according to a communication standard such as Z-Wave, Zigbee (registered trademark), wireless LAN, or the like. However, any communication standard, scale, or configuration can be used for the network 5 if communication is possible between the monitoring apparatus 1 and the external devices 3a, and 3b.

Upon receiving a light up or flash instruction command for the indicator from the monitoring apparatus 1, the external devices 3a, and 3b make the indicator (electric light, LED, or the like) light up or flash. One purpose of making the indicator light up or flash is specifying (confirming) which device among the external devices that are installed is the external device that is operating on the display screen. However, the purpose of the indicator is not limited thereto, and for example, it may also be used in order to check the operating status of the external devices 3a, and 3b.

Note that although in the present embodiment, an example is explained below in which the indicator is made to flash, the indicator may also be made to light up. In a case in which the communication standard for the network 5 is Z-Wave, the indicator flash instruction command uses an indicator set command, or the like.

The flashing format of the indicator such as the strength, flashing time, flashing number, and the ratio of light emitting and non-light emitting times during one flash during the light is being emitted for the indicator flashes may be configured to be set by indicator flash instruction commands, or may also flash in a flashing format that has been determined in advance by the external device.

Figure 2A:
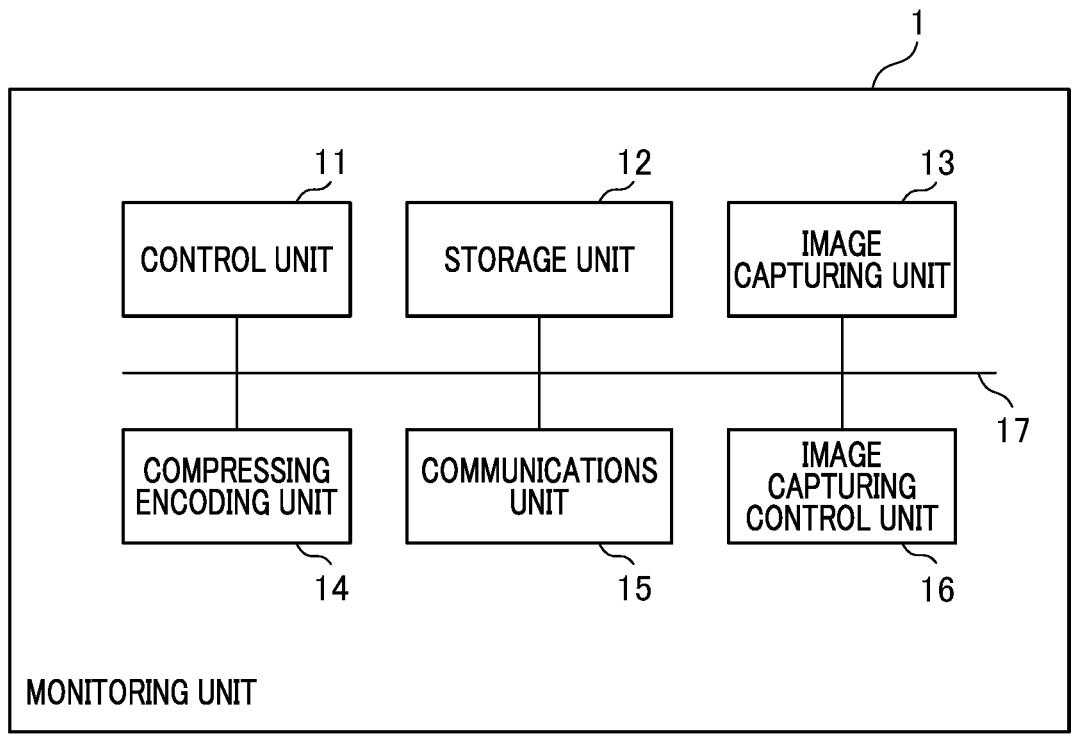
FIG. 2A is a functional block diagram showing one example of a configuration of a monitoring apparatus 1 according to the First Embodiment.
Figure 2B:
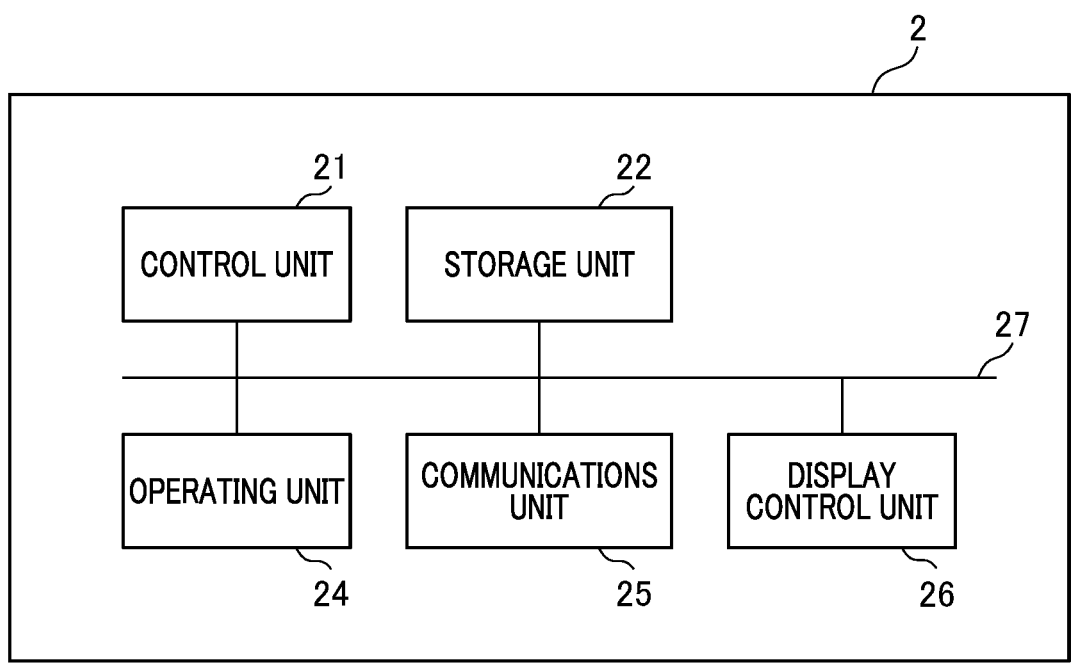
FIG. 2B is a functional block diagram showing one example of a configuration of a client apparatus 2 according to the First Embodiment.

Next, FIG. 2A is a functional block diagram showing one example of a configuration of the monitoring apparatus 1 according to the First Embodiment, and FIG. 2B is a functional block diagram showing one example of a configuration of the client apparatus 2 according to the First Embodiment.

Note that a portion of the functional blocks shown in FIG. 2A, and FIG. 2B are realized by a computer that is included in the monitoring apparatus 1 or the client apparatus 2 executing a computer program that has been stored on a storage unit that serves as a storage medium. However, a portion or the entirety thereof may also be realized by hardware.

An Application-Specific Integrated Circuit (ASIC) and a processor (a reconfigurable processor, a DSP), or the like can be used as the hardware. In addition, each of the functional blocks that are shown in FIG. 2A, and FIG. 2B may be encased in the same housing, or they may also be configured by separate apparatuses that are connected to each other via a signal path.

As is shown in FIG. 2A, the monitoring apparatus 1 is provided with a control unit 11, a storage unit 12, an image capturing unit 13, a compressing encoding unit 14, a communications unit 15, an image capturing control unit 16, and the like. Each configurational unit of monitoring apparatus 1 is connected via a bus 17.

As has been described above, a CPU that serves as a computer is provided in the control unit 11, and controls the operations of each unit of the entire monitoring apparatus 1 based on the computer program that has been stored on the memory serving as the storage unit. Note that the control unit 11 controls a display screen that performs superimposed display of information relating to an external device on a video image including the external device that has been captured by the image capturing unit 13.

The storage unit 12 stores each type of data. The storage unit 12 mainly has a storage area for the computer program that the CPU of the control unit 11 executes, and a work area for when the program is being executed. In addition, the storage unit 12 is used as a storage area for various data such as a storage area for management information for the external device, setting information for image detection and the like, setting information for event triggers and action rules, and image data generated by the image capturing unit 13 and the control unit 11, and the like.

In addition, when the monitoring apparatus 1 adds an external device to the management targets, each type of information for the external device, for example, supporting command information, the device type for the external device, and the like is acquired and stored on the storage unit 12.

The image capturing unit 13 acquires an analogue signal by capturing images of a subject image that has been formed by an image capturing optical system, which is not illustrated. Furthermore, the analogue signal is converted to a digital data, necessary image processing is performed, and this is stored on order on the storage unit 12 as captured images. The control unit 11 receives image acquisition events from the image capturing unit 13 in a case in which a captured image has been stored on the storage unit 12.

The compressing encoding unit 14 generates image data by performing compression encoding processing based on a format such as JPEG (Joint Photographic Expert Group) or H.264, and the like on the captured image or generated superimposed image that has been stored by the image capturing unit 13, and stores these on the storage unit 12.

The communications unit 15 receives control commands from external apparatuses such as the client apparatus 2 and the like, and transmits responses to the control commands to the external apparatus. In a case in which the communications unit 15 has received a command from an external apparatus, the control unit 11 receives a command reception event from the communications unit 15.

In addition, the communications unit 15 transmits control commands generated by the control unit 11 to the external apparatus. Furthermore, the communications unit 15 reads out image data that has been compressed and encoded by the compressing encoding unit 14 from the storage unit 12 in order and transmits this to the client apparatus 2 to serve as a video image stream.

The image capturing control unit 16 changes the angle of view and the like of the image capturing unit 13 by having a drive unit perform each of pan drive, tilt drive, zoom drive, rotation drive, or focus drive based on a pan, tilt, rotation, zoom, or focus value that has been instructed by the control unit 11. Note that the monitoring apparatus 1 may also be a configuration that does not include a portion or the entirety of the plurality of drive units described above. In addition, electronic pan, tilt, rotation, zoom, and the like may also be executed by image extraction.

In addition, as is shown in FIG. 2B, the client apparatus 2 is provided with a control unit 21, a storage unit 22, an operating unit 24, a communications unit 25, a display control unit 26, and the like. Each configurational unit of the client apparatus 2 is connected via a bus 27.

The control unit 21 is provided internally with a CPU that serves as a computer, and controls the operations of each unit of the entirety of the client apparatus 2 based on a computer program that has been stored on a memory serving as a storage medium.

The storage unit 22 has the same configuration as the storage unit 12, the communications unit 25 has the same configuration as the communications unit 15, and the operating unit 24 includes a keyboard, a mouse, and a touch panel. 26 is a display control unit, and performs control of images displayed on the display unit 6. 27 is a bus.

Figure 3:
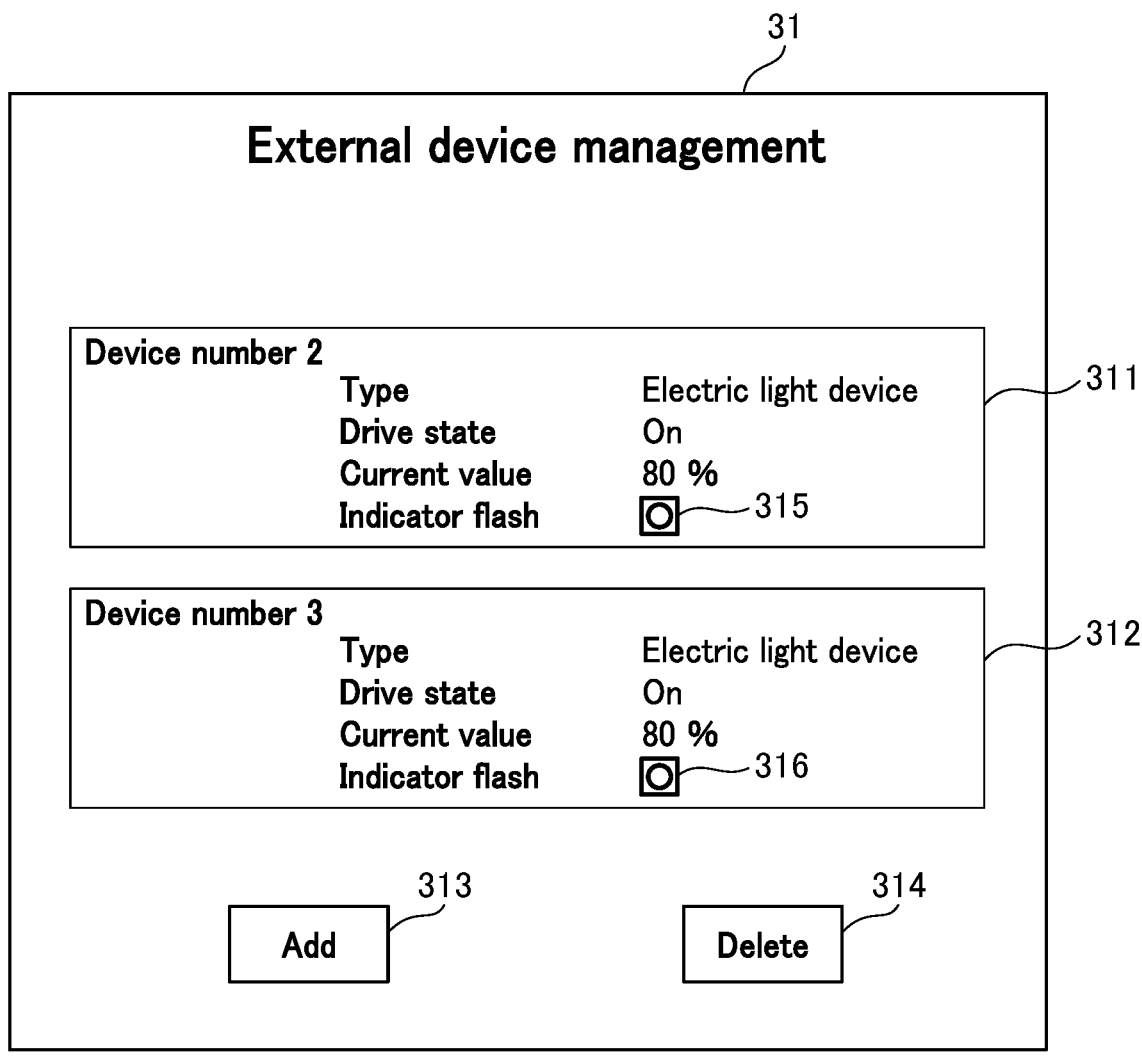
FIG. 3 is a diagram showing one example of a display screen 31 for external device management settings in a monitoring apparatus 1 according to the First Embodiment.

Next, an example of a display screen displayed on the display unit 6 of the client apparatus 2 will be explained. FIG. 3 is a diagram showing one example of a display screen 31 for external device management settings in the monitoring apparatus 1 according to the First Embodiment.

The display screen 31 is displayed by the CPU that serves as the computer inside of the control unit 21 of the client apparatus 2 executing a program that is stored on the storage unit 22 of the client apparatus 2 based on instructions from a user to perform external device management settings.

The display screen 31 displays management information 311, and 312 that display management information for each of the external devices 3a, and 3b, an add button 313 that adds a new external device, and a delete button 314 that deletes a registered external device.

The monitoring apparatus 1 is transitioned to a state in which an external device can be added by the user pressing the add button 313. Along with this, by transitioning the external device that the user would like to add to a state in which it can be added by pressing a physical button or the like that is provided on the housing of the external device, this external device is registered as an external device that the monitoring apparatus 1 manages.

Note that the method for registering external devices is not limited thereto, and for example, external devices may also be registered using other methods such as automatically registering external devices based on identification information for external devices that has been registered in the monitoring apparatus 1 in advance, or the like. In this manner, the external devices 3a, and 3b are registered in the monitoring apparatus in advance, and the management information 311, and 312 are displayed.

The management information 311 displays a "device number" for identifying registered devices, a "type" that shows what kind of functions are primarily held by the external device 3a, and a "drive state" that shows whether or not communication with the external device 3a is in an on state. Furthermore, a "current value" that shows the current state of the functions held by the external device (for example, the current operating rate, or the like) is displayed. This information is transmitted by the external device 3a, received by the communications unit 15, and stored on the storage unit 12.

In the management information 311 in FIG. 3, "number 2" is shown in "device number", "electric light device", which shows an electric light type device, is shown in "type", "on", which shows that the device is operating, is shown in "drive state", and "80%", which is the operating rate of the light emission brightness is shown in "current value". However, the information that is displayed in the management information 311 is not limited to the information described above, and the type and combination thereof do not matter as long as this is information relating to the external device 3a.

In addition, in "type", instead of an electric light device, "multi-level switch", which indicates a device in which numerical values can be set, or the like can also be displayed. In addition, a button reading "indicator flash", which makes the indicator of the external device 3a flash in order to specify the external device 3a is displayed in the management information 311.

In the management information 312 that displays information for the external device 3b, "number 3" is displayed as the "device number", and the other information is the same as that in relation to the management information 311.

Figure 4:
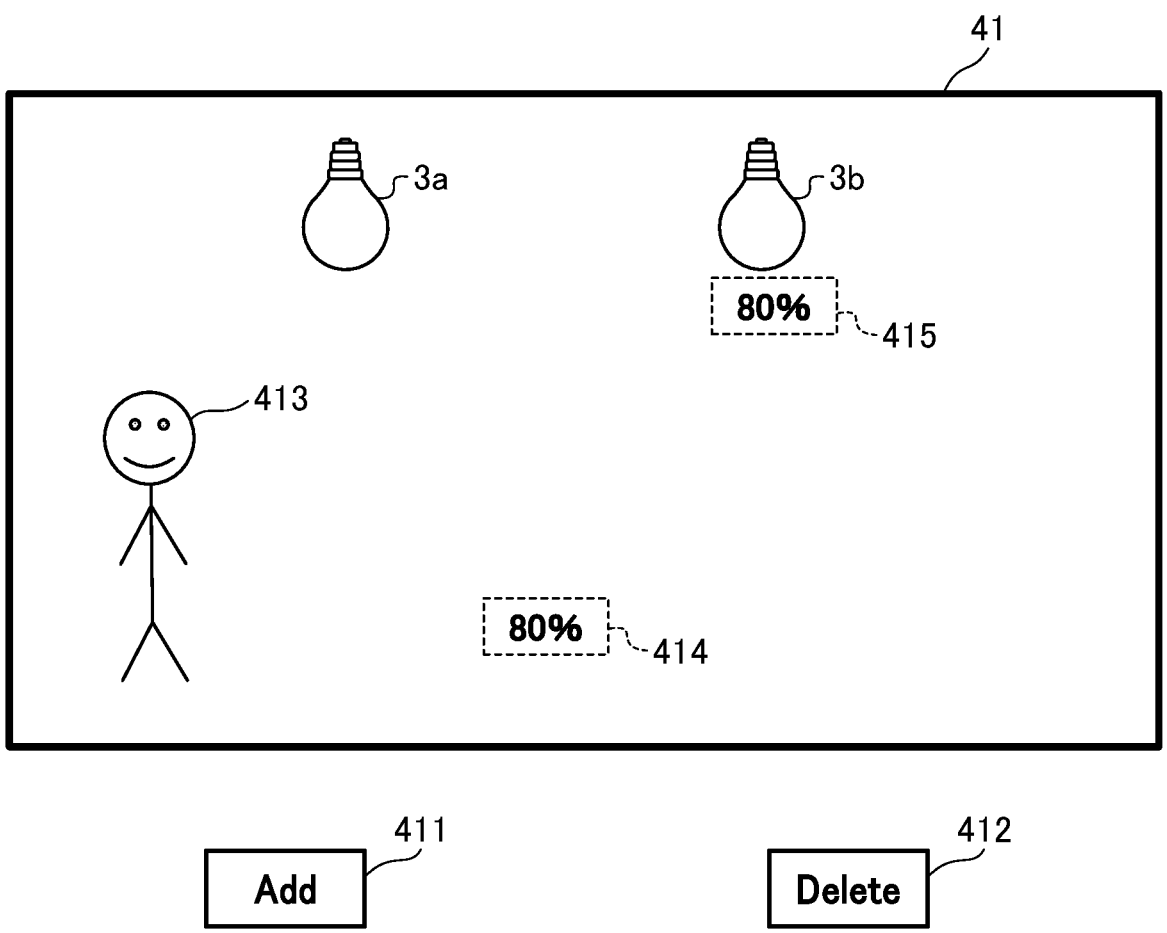
FIG. 4 is a diagram showing one example of a display screen 41 for making a superimposed setting of a "current value" of an external device in a monitoring apparatus according to the First Embodiment.

FIG. 4 is a diagram showing one example of a display screen 41 for making a superimposed setting of the "current value" of the external device in the monitoring apparatus 1. The display screen 41 is displayed by the CPU that serves as the computer inside of the control unit 21 of the client apparatus 2 executing a program that is stored on the storage unit 22 of the client apparatus 2 based on instructions for performing the setting of a superimposed display by the user.

An image capturing screen is displayed on the entire display screen 41. In addition, the external devices 3a, and 3b, an add button 411 for adding a new superimposed display, a delete button 412 for deleting a superimposed display, a subject 413, and superimposed display setting boxes 414, and 415 that display the current values for the external devices 3*a*, and 3*b* are further displayed on the display screen 41.

A superimposed display in which each current value for the external devices that have already been added on the display 31 by the user is displayed on the display screen 41. Thereby, upon the add button 411 being clicked, a display box such as, for example, the superimposed display setting box 414, is displayed on the display screen 41. Next, by indicating the device number for the external device that is associated with the superimposed display setting box 414, the current value that has been acquired from the associated external device is displayed inside of the superimposed display setting box 414.

In the superimposed display setting box 414, for example, 80%, which is the current value acquired from the external device 3*a*, is displayed. Note that this can be made a configuration that takes into account that the external device holds multiple types of functions, and indicates the type of function for the current value that is being displayed in addition to the device number, or each of the current values for the plurality of types of functions may also be displayed.

In addition, the display is not limited to the "current value" for the functions of the external device, and other values such as for example, the "drive state" may also be displayed. In addition, settings that indicate the scope of the angle of view for the pan and tilt, and the zoom ratio that display the superimposed display may also be carried out.

Next, the user uses the operating unit 24 such as the mouse and the like of the client apparatus 2 and disposes the superimposed display setting box 414 in the vicinity of the corresponding external device 3*a* on the display screen 41 by dragging and dropping the superimposed display setting box 414. Specifically, this is disposed in the vicinity of the corresponding external device (for the superimposed display setting box 415, this is the external device 3*b*) similar to the superimposed display setting box 415.

The information that has been obtained in this manner such as the setting state for the superimposed display setting box, and the like is stored on the storage unit 12 of the monitoring apparatus 1. The control unit 11 generates an image (a video image) in which a superimposed display has been superimposed on a captured image based on the information for the superimposed display setting box that has been stored, and stores this on the storage unit 12 or the storage unit 22 to serve as a superimposed image (superimposed video image).

In addition, superimposed display setting boxes can be deleted by selecting the superimposed display setting box that the user would like to delete on the screen using the mouse or the like and clicking the delete button 412.

Figure 5:
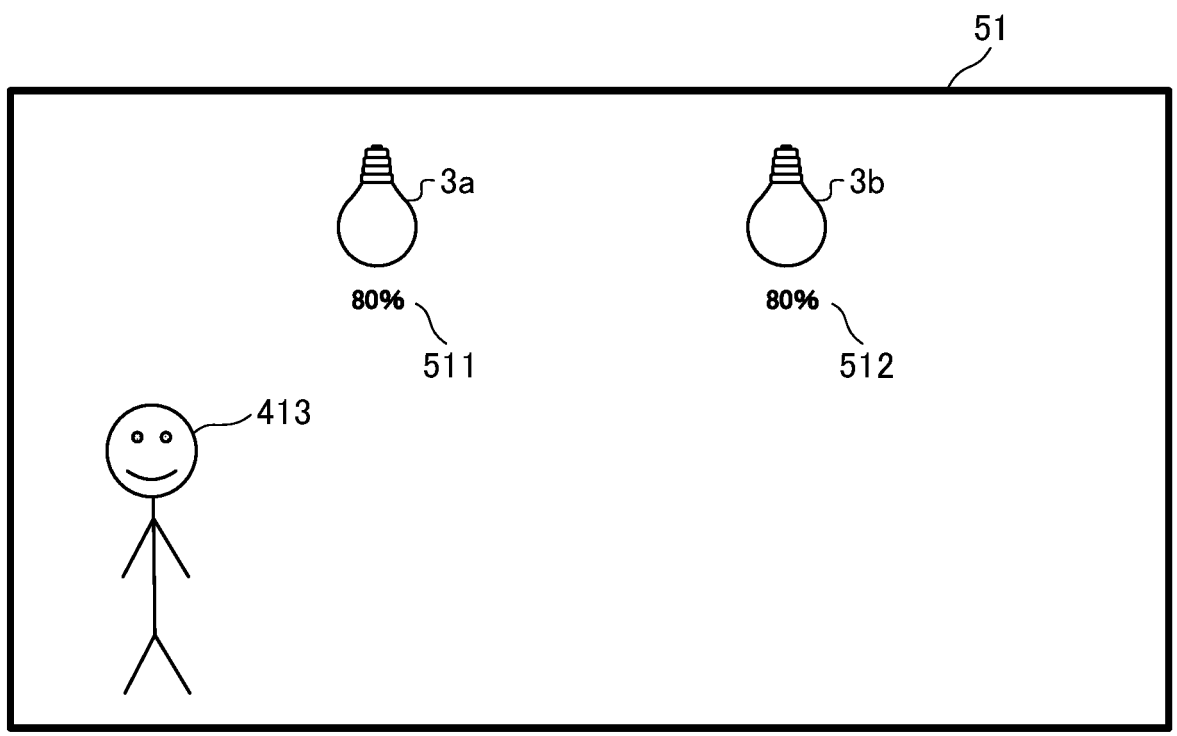
FIG. 5 is a diagram showing one example of a display screen 51 displaying a superimposed image according to the First Embodiment.

FIG. 5 is a diagram showing one example of a display screen 51 on which a superimposed image according to the First Embodiment has been displayed. The display screen 51 is displayed by the program that has been stored on the storage unit of the client apparatus 2 being executed according to an instruction to perform display of the display screen being output by the client apparatus 2.

The display screen 51 of FIG. 5 displays the external devices 3*a*, and 3*b*, the subject 413, and superimposed displays 511, and 512 of information relating to the external device (the brightness of the illuminating unit, or the like) corresponding to each of the external devices 3*a*, and 3*b* that have been set on the display screen 41.

Figure 6:
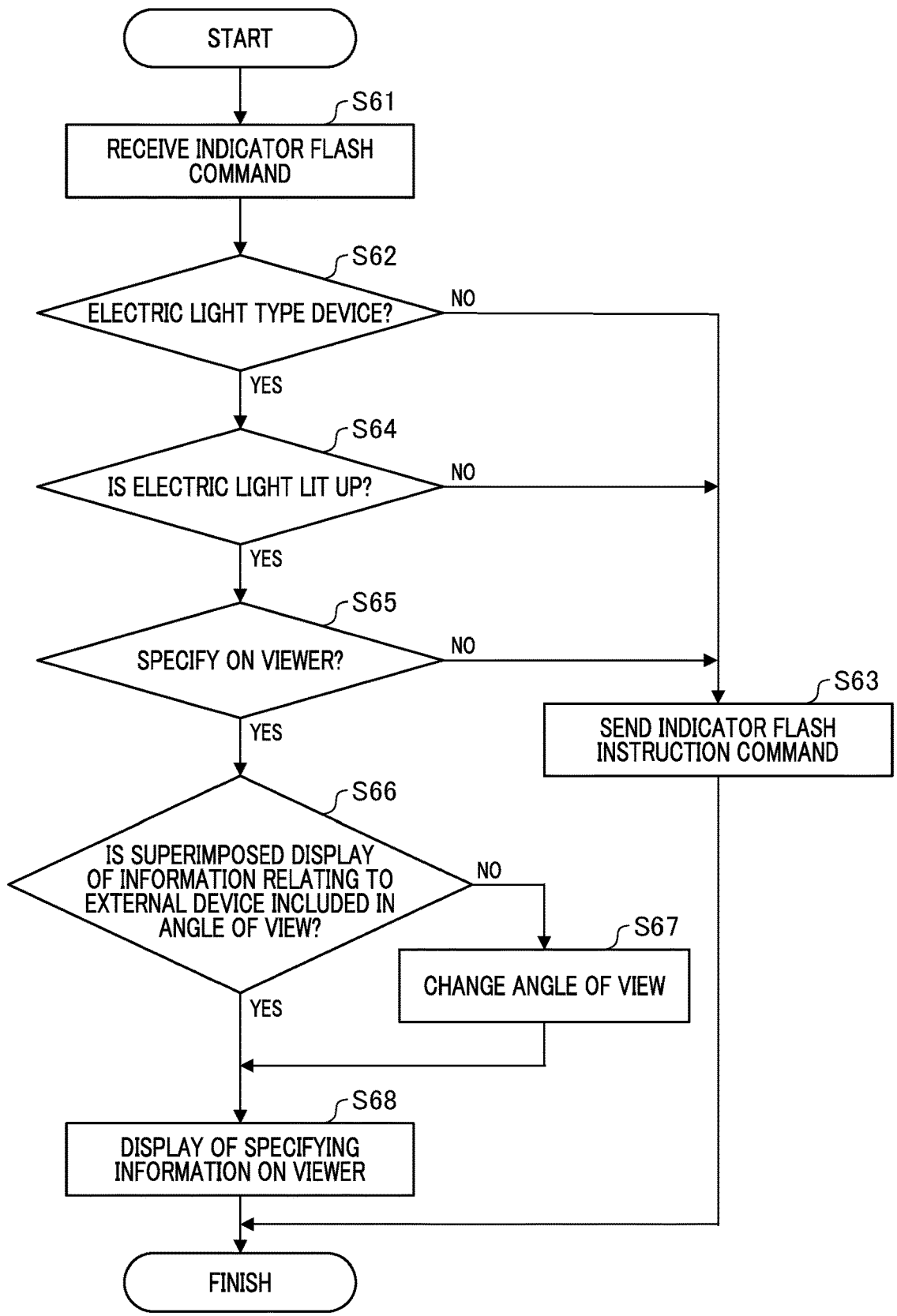
FIG. 6 is a flowchart showing one example of processing for a monitoring apparatus according to the First Embodiment.

Next, an example of the operations of the monitoring apparatus 1 will be explained in reference to the flowchart in FIG. 6. FIG. 6 is a flowchart showing one example of processing for the monitoring apparatus according to the First Embodiment, and the flowchart in FIG. 6 is realized by the CPU that is provided inside of the control unit 11 of the monitoring apparatus 1 executing a program that has been stored on the storage unit 12.

During step S61, the control unit 11 receives an indicator flash instruction command from the client apparatus 2 via the communications unit 15. At this time, the user clicks the indicator flash buttons 315, and 316 in the management information for the external device that they which to specify among the external devices that are displayed on the display screen 31.

Upon these buttons being clicked, an indicator flash instruction command is transmitted by the client apparatus 2, which is received by the communications unit 15 of the monitoring apparatus 1, and stored on the storage unit 12. The example in the present flowchart assumes that the user has clicked, for example, the indicator flash button 315 of the management information 311 in order to specify the external device 3*a*.

During step S62, the control unit 11 determines whether or not the external device that was the target of the indicator flash instruction is an electric light type device. Specifically, the control unit 11 acquires the information for the external device for the indictor flash command from the storage unit 12, and determines whether or not this is an electric light type device.

At this time, in a case in which the communication standard for the network 5 is for example, Z-wave, in a case in which it has been determined that the Device Type included in this information is Light Dimmer Switch or Color Switch, it is determined to be an electric light type device. Alternatively, in a case in which this external device supports a Color Switch command class, it is determined to be an electric light type device.

In addition, the processing may also be made such that a file that is a database in which the device type for each type of external device has been recorded is stored on the storage unit 12 in advance, and whether or not the target external device is an electric light type device is referenced in this database file.

In a case in which it has been determined that the device is an electric light type device, the processing proceeds to step S64, and if this is not the case, the process proceeds to step S63. Note that in the example in FIG. 6, the user clicks the indicator flash button 315 in the management information 311 in order to specify the external device 3*a*, and therefore, the processing proceeds to step S64.

During step S63, the control unit 11 transmits an indicator flash instruction command to the external device that had an indicator flash instruction during step S61 via the communications unit 15, and the processing in the present flowchart is completed. For example, in a case in which the communication standard for the network 5 is Z-Wave, the indicator flash instruction command uses an indicator set command or the like. The indicator of the external device 3*a*, which is not indicated, thereby flashes.

During step S64, the control unit 11 determines whether or not the electric light (illuminating unit) of the target external device is currently lit up. Specifically, the control unit 11 transmits a command to confirm the current value for the present electric light to the target external processing device, and performs the determination according to the contents of the response thereto. At this time, the control unit 11 determines that the illuminating unit is in use in a case in which the illuminating unit is lit up.

In the present embodiment, it is assumed that the communications standard for the network 5 is, foe example, Z-Wave. Therefore, the Current Value or Target Value for a Multi-level Switch Report, binary switch report, or color switch report that are included in the information acquired from this external device are confirmed. If these values are 0x01 or greater, it is determined that the electric light is currently lit up.

In addition, the processing may also be made such that the value for when a light up command was made for an external device that was previously a target is stored to serve as the current value for the electric light in the storage unit 12, and whether or not the electric light is currently lit up is determined based on this current value. In a case in which it has been determined that the electric light is currently lit up, the processing proceeds to step S65, and if this is not the case, the processing proceeds to step S63.

During Step S65, the control unit 11 determines whether or not to display a mark, or the like for specifying an external device on the screen of the display unit of the client apparatus 2. The control unit 11 therefore transmits a command to display the display screen 71 of FIG. 7 to the display apparatus 2 via the communications unit 15, and the display screen 71 is displayed on the display unit 6 of the client apparatus 2.

That is, step S65 functions as a control step that controls a display screen that performs superimposed display of information relating to an external device on a video image including the external device that was captured by an image capturing unit. In addition, during step S65, a screen is displayed for displaying predetermined specifying information in the vicinity of the external device on the display screen. In this context, the screen for displaying the specifying information includes a screen that prompts the display of specifying information (display screen 71 of FIG. 7).

Figure 7:
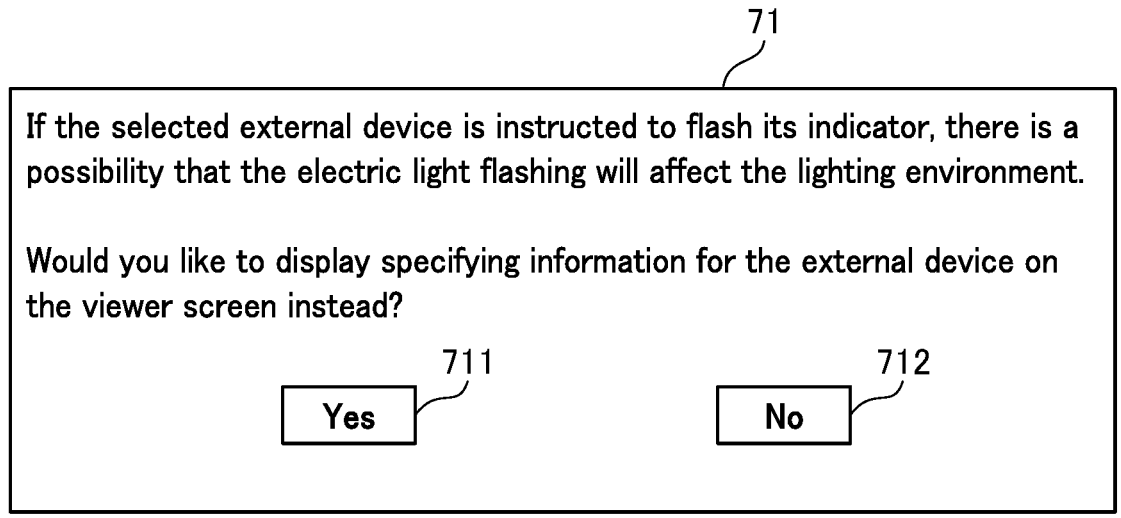
FIG. 7 is a diagram showing one example of a display screen prompting display of specifying information on a display unit of a client apparatus 2 according to the First Embodiment.

FIG. 7 is a diagram that shows one example of a display screen for prompting the display of specifying information on the display unit of the client apparatus 2 according to the First Embodiment. The display screen 71 that is shown in FIG. 7 is displayed by the CPU that is provided inside of the control unit of the client apparatus 2 executing a program that is stored on the storage unit of the client apparatus 2 in response to the command that has been sent from the control unit 11 during step S65.

If the indicator of the external device that has been selected flashes, this will influence the lighting environment, and therefore, a dialogue for confirming if specifying information (a mark or the like) for specifying the external device should be displayed on the viewer screen instead is displayed on the display screen 71.

In addition, a button 711 for determining to display the specifying information (mark or the like) for specifying the external device on the viewer screen and a button 712 for determining to not display the specifying information for specifying the external device on the viewer screen are displayed on the display screen 71.

Note that the control unit 11 may also confirm whether or not the display of the specifying information (mark or the like) for specifying the target external device has been set from specifying information display settings that are stored on the storage unit 12. In addition, in a case in which specifying information display settings have not been stored, the control unit 11 may also instruct the client apparatus 2 so as to display a warning asking "The electric light flashing may affect the lighting environment. Would you still like to make it flash?". That is, the screen prompting the display of specifying information also includes, for example, screens that display warnings and the like.

By the display screen 71 being displayed and the user clicking either the button 711 or the button 712, determination information is transmitted to the monitoring apparatus 1 by the communications unit of the client apparatus 2, and the determination information that has been received via the communications unit 15 is stored on the storage unit 12.

During step S65, whether or not the determination information that has been received is determination information for displaying the specifying information on the viewer screen is determined. In a case in which the button 712 has been clicked and No has been determined in step S65 (a case in which the display of the specifying information has not been set), the present flowchart is completed after making the indicator flash during step S63.

That is, if the illuminating unit of the external device is not being used, the illuminating unit is made to light up or flash during step S63. Note that if the button 711 from FIG. 7 has been clicked on the client apparatus side, the display may also transition immediately to the display screen 81 on the client apparatus side.

In a case in which Yes has been determined during step S65, the processing proceeds to step S66, and the control unit 11 determines whether or not a superimposed display of information (the brightness of the illuminating unit, or the like) relating to the target external device is included in the angle of view that is captured by the image capturing unit 13.

By the image capturing control unit 16 changing the angle of view, it is possible that the superimposed display of the target external device that was set on the display screen 41 will be made to be outside of the angle of view. That is, there are cases in which the superimposed display of the external device is not included in the angle of view (in the screen) due to the pan/tilt angle or the zoom ratio at which images are being captured by the monitoring apparatus 1.

Therefore, during step S66, the control unit 11 determines if all of the coordinates for the superimposed display of information relating to the target external device that are stored on the storage unit 12 are included in the current angle of view of the captured image.

In addition, in cases in which even when the superimposed display is inside of the angle of view of the captured image, but settings have been performed to limit the range of the angle of view at which the superimposed display is actually being displayed, it is determined that the superimposed display of information relating to the target external device is included in the angle of view only when the angle of view is within that range. This is because there are cases in which settings have been performed to display the superimposed display only in a specific range of pan/tilt angles and zoom ratios, or the like.

During step S66, in a case in which it has been determined that the superimposed display of the information relating to the target external device is included in the angle of view, the processing proceeds to step S68, and if this is not the case, the processing proceeds to step S67. Note that in a case in which the monitoring apparatus 1 does not have a function to change the angle of view, the processing also proceeds to step S68.

During step S67, the control unit 11 changes the angle of view such that the superimposed display is displayed within the angle of view of the captured image. Specifically, the control unit 11 performs an instruction for changing the angle of view to the image capturing control unit 16 such that all of the coordinates for the superimposed display of the information relating to the target external device that are stored on the storage unit 12 are inside of the angle of view for the superimposed display. That is, it changes the angle of view such that the superimposed display of the information relating to the external device is displayed inside of a predetermined angle of view of the video image.

The change instruction for the angle of view can use any kind of method as long as it is a change instruction such that all of the coordinates for the superimposed display are included in the angle of view for the superimposed display. For example, a change instruction may be made such that the angle of view from when the superimposed display has been set on the display screen 41 is stored on the storage unit 12, and the angle of view is made the same as this stored angle of view, or a change instruction may also be made such that the superimposed display is displayed on the center of the screen.

Figure 8:
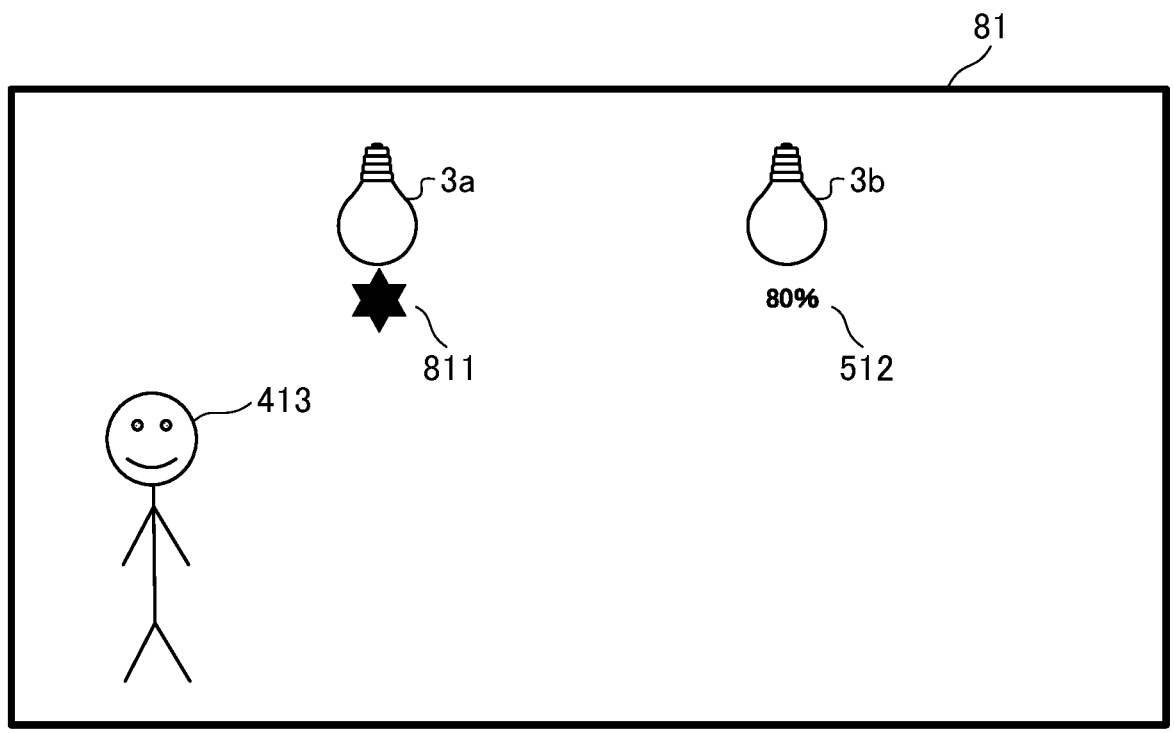
FIG. 8 is a diagram showing one example of a display screen on which specifying information has been superimposed on a viewer according to the First Embodiment.

During step S68, the control unit 11 superimposes and displays the specifying information for the target external device on the captured image as is shown in FIG. 8. FIG. 8 is a diagram showing one example of a display screen on which specifying information has been superimposed on a viewer according to the First Embodiment.

As is shown in FIG. 8, the control unit 11 generates a superimposed image in which specifying information 811 (an icon or mark or the like) for specifying the target external device has been superimposed on the captured image. That is, a screen (the display screen 81 in FIG. 8) for displaying predetermined specifying information in the vicinity of the external device is displayed.

The video image stream that is based on the generated superimposed image is streamed to the client apparatus 2 via the communications unit 15, and a viewer screen such as the display screen 81 in FIG. 8 is displayed on the display unit 6 of the client apparatus 2.

That is, the captured image is displayed on the entirety of the display screen 81, and the external devices 3*a*, and 3*b*, the subject 413, a superimposed display 512 corresponding to the current value of the external device 3*b* that was set on the display screen 41, and specifying information 811 (an icon or a mark or the like) specifying the external device 3*a* are further displayed.

Note that when generating the superimposed image, the control unit 11 superimposes specifying information 811 such as an icon, a mark, or the like that specifies the external device 3*a* instead of the current value or the like of the external device 3*a*, or as additional information, in the position of the superimposed display 511 in FIG. 5. In addition, the generated superimposed image (superimposed video image) is stored on the storage unit 12. Note that, the specifying information 811 may also be an icon, mark, or the like showing a shape such as for example, a star, a circle, or a square, or it may also be an icon, mark, or the like with any kind of shape or color.

Alternatively, the information relating to the external device that serves as the specifying information (the device number, the name and current value of this device, or the like) may also be displayed so as to stand out. That is, the superimposed specifying information (the device number, the name, and the current value, or the like) may also be made information that is made to periodically flash, for which the size has been changed, or for which the color or brightness has been changed, or an emphasized display such that this stands out even more may also be performed.

That is, the information relating to the external device that serves as the specifying information may also include at least one of the device number for the external device, the name of the external device, or the current value relating to the operational state of the external device.

In addition, this may also be changed to a way of emphasizing the display according to the drive state of the external device such as changing the color to green when the external device is on, yellow when it is in sleep mode, red when it is off, or the like. In addition, in a case in which the average luminance around the specifying information is high or low, it may also be changed such that the color of the specifying information is changed to be darker or brighter, or the like.

Note that the present embodiment has explained an example in which specifying information is displayed as being superimposed on a captured image that is currently being captured by the image capturing unit 13. However, for example, snapshot images from when superimposed display settings for the target external device were performed on the display screen 41 may be stored on the storage unit 12, and these snap images may be used for the superimposed display of the specifying information.

Specifically, in a case in which the control unit 11 has determined that specifying an external device on the viewer screen has been determined during step S65, the processing proceeds to step S68. In addition, during step S68, when the superimposed image in which the specifying information is superimposed is being generated, the specifying information may also be superimposed in the position of the superimposed display settings for the target external device on the previously described snapshot image.

As has been described above, in the First Embodiment, when the user clicks on the flash indicator button on the display screen 31 for the external device to be specified, in a case in which the electric light for the target external device is lit up, information (a mark or the like) specifying the target external device is displayed as being superimposed on the image.

That is, during the image processing method that is shown in step S61 to step S68, when an instruction to light up or flash the illuminating unit of an external device has been input, the control unit 11 determines whether or not the illuminating unit for this external device is in use. Then, in a case in which it is in use, instead of lighting up or making the illuminating unit flash, a screen is displayed on the display screen in order to display predetermined specifying information in the vicinity of the external device.

Therefore, even in cases in which monitoring is being performed while illuminating a subject using the electric lamp that serves as the illuminating unit, it is possible to specify and confirm the external device on the viewer screen without making the electric light flash. Note that in cases in which even if the indicator is made to flash instead of the electric light, in cases in which the strength of light emission for the indicator is strong, there are cases in which this will cause a negative influence, and therefore, by specifying and confirming an external device on the viewer screen, it is possible to suppress this negative influence.

Second Embodiment

Although in the First Embodiment, a case in which whether or not the electric light of the external device is lit up is determined was explained, in the Second Embodiment, whether or not image detection has been set will be explained. Note that the configuration of the monitoring system according to the present embodiment is the same as that in the First Embodiment.

Figure 9:
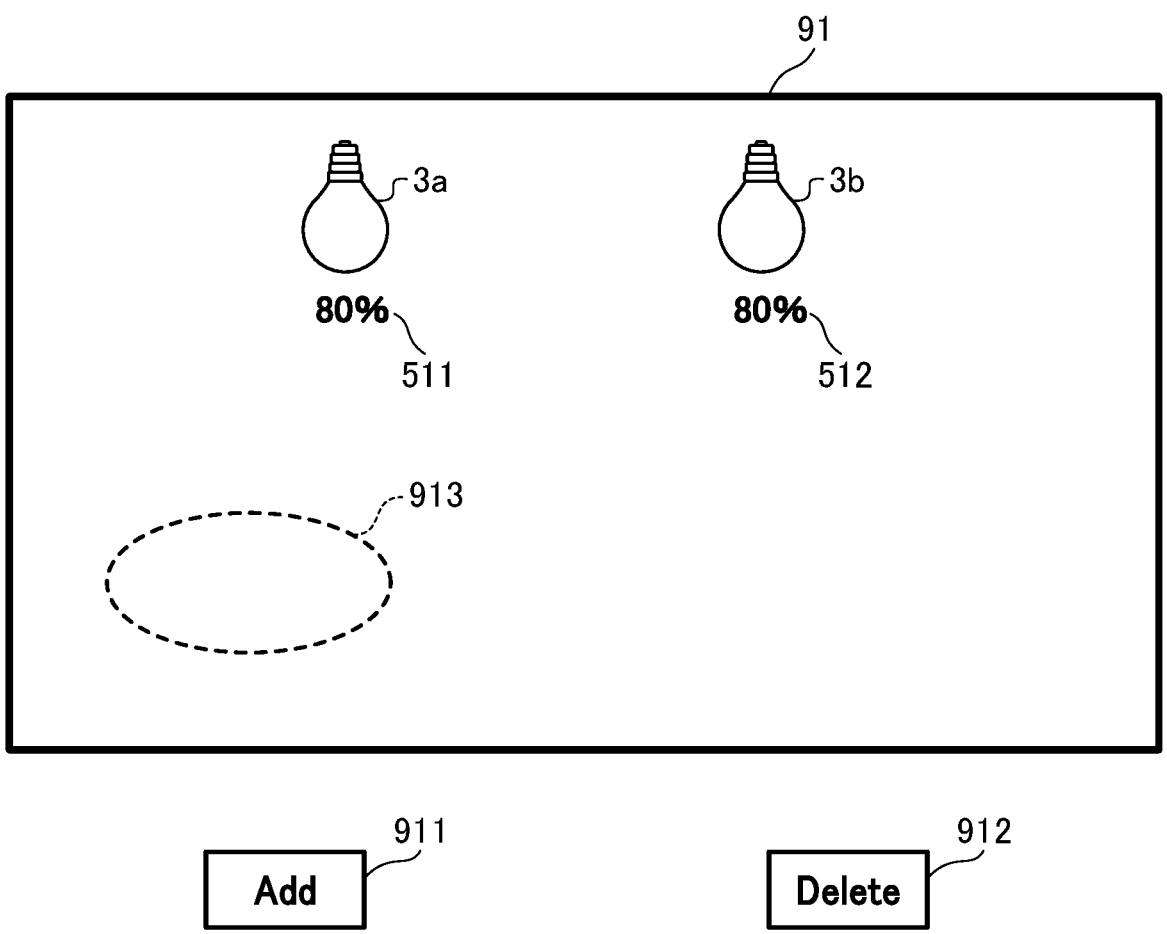
FIG. 9 is a diagram showing one example of a display screen 91 for setting an image detection for an external device in a monitoring apparatus 1 according to a Second Embodiment.

FIG. 9 is a diagram showing one example of a display screen 91 for setting image detection of an external device in the monitoring apparatus 1 according to the Second Embodiment. The display screen 91 is displayed by the CPU inside of the control unit of the client apparatus 2 executing a program that is stored on the storage unit of the client apparatus 2 based on an instruction to perform image detection setting.

The external devices 3a, and 3b, an add button 91 for adding a new image detection region, a delete button 912 for deleting an image detection region that has been added, an image detection region 913, and the superimposed displays 511, and 512 that display the current values for the external devices 3a, and 3b, and the like, are displayed on the display screen 91.

The user performs settings in advance for image detection on the video image that is being captured by the image capturing unit 13. The video detection may be any kind of video image detection such as, for example, moving body detection that detects a moving body in the detection region, as long as it analyses and performs detection on a video image. When the user clicks the add button 911, a setting box for a detection region such as the image detection region 913 is displayed.

After this, an input device such as a mouse or the like that has been connected to the client apparatus 2 is used, and the image detection region is moved to an appropriate position within the screen, or the size of the image detection region is changed by dragging and dropping the setting box. In addition, in a case in which the user would like to delete the setting box, they can delete it by clicking the delete button 912 after having clicked on this setting box.

Note that the image detection may also be set in any way according to the type of image detection, such as setting the image detection to the entire screen, or drawing a border line that determines the detection border. The image detection settings that are obtained in this manner are stored on the storage unit 12 via the communications unit 15 of the monitoring apparatus 1 by the communications unit of the client apparatus 2.

Figure 10:
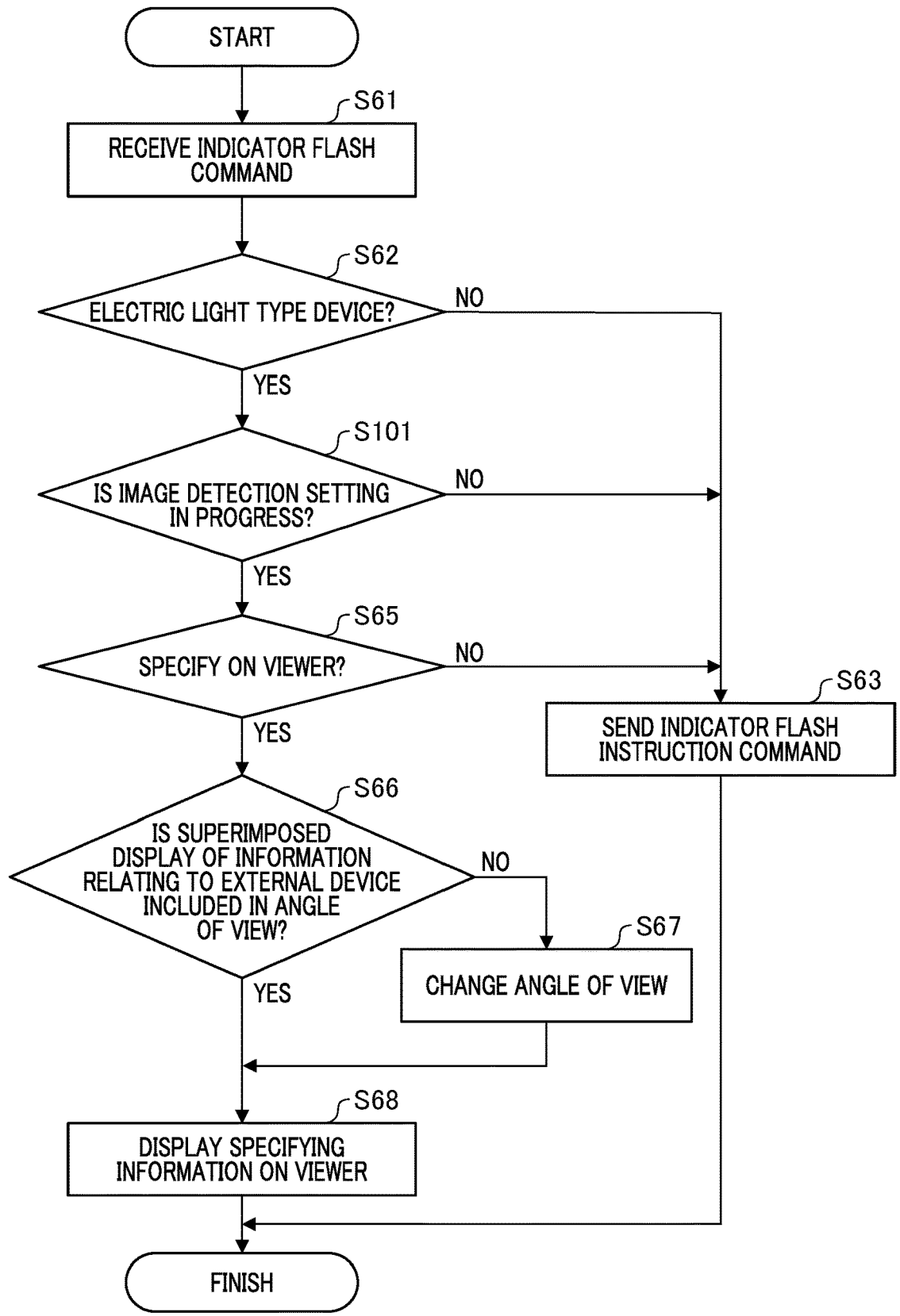
FIG. 10 is a flowchart showing one example of processing for a monitoring apparatus according to the Second Embodiment.

Next, an example of the processing for the case in which image detection has been set will be explained in reference to a portion of the flowchart in FIG. 10. FIG. 10 is a flowchart showing one example of processing for a monitoring apparatus according to the Second Embodiment. Note that the operations for each step of the flowchart in FIG. 10 are performed by the CPU that serves as the computer inside of the control unit 11 executing a computer program that has been stored on a memory.

In the flowchart in FIG. 10, the processing for the steps that have been given the same reference numbers as the steps in flowchart in FIG. 6 is the same as the processing for these steps, and therefore explanations thereof will be omitted. In FIG. 10, instead of processing for determining whether or not an electric light is lit up, during step S101, the control unit 11 determines whether or not image detection has been set.

Specifically, the control unit 11 acquires whether or not image detection settings were performed on the display screen 91 from the storage unit 12. In a case in which it has been determined that image detection has been set, the processing proceeds to step 65, and if this is not the case, the process proceeds to step S63.

Note that further additional conditions may also be set, not just image detection being set. For example, during step S101, the control unit 11 references whether or not image detection has been set, and whether or not rules have been set is determined by referring to the storage unit 12 to perform predetermined operations with an image detection event serving as a trigger.

In addition, if the result of step S101 is Yes, the processing proceeds to step S65, and in a case on No, the processing proceeds to step S63. That is, if an image recognition operation based on the video image is not in progress, the illuminating unit is made to light up or flash during step S63.

In addition, in a case in which an image detection event is occurring, there are cases in which, for example, it is not desirable for changes to the lighting environment to occur because some sort of phenomena such as a moving body passing by, or the like is currently occurring. Thus, the processing may also be made such that the control unit 11 references the storage unit 12 about whether an image detection event is occurring, and in a case in which one is occurring, the processing proceeds to step S65, and in a case in which one is not, the processing proceeds to step S63.

In this manner, in the Second Embodiment, when the user has clicked the indicator flash button on the display screen 31 for the external device that they would like to specify, in a case in which image detection has been set, information (a mark, or the like) that specifies the target external device is displayed as superimposed on the image.

That is, in the Second Embodiment, in step S61 to step S68 of FIG. 10, when a light up or flash instruction for the illuminating unit of the external device has been input, the control unit 11 determines whether or not an image recognition operation based on the video image is in progress. In addition, in a case in which an image recognition operation is in progress, a screen for displaying predetermined specifying information in the vicinity of the external device is displayed on the display screen instead of making the illuminating unit light up or flash.

Therefore, it is possible to specify the external device on the viewer screen without making the indicator flash, and it is possible to prevent erroneous operations for the image detection operations caused by changes occurring to the lighting environment due to the indicator flashing.

Other Embodiments

Above, the present invention has been described based on preferred embodiments (examples) thereof. However, the present invention is not limited to the above-described embodiments (examples), and various changes based on the gist of the present invention are possible, and these changes are not excluded from the scope of the present invention.

For example, a portion or the entirety of the functional configurations of the above-described monitoring system may also be made hardware, and may be included in the monitoring apparatus 1, the client apparatus 2, and the external devices 3a, and 3b.

In addition, the configurations, processing, and the like of each embodiment that was described above may also be applied to a device other than the monitoring apparatus 1, the client apparatus 2, and the external devices 3a, and 3b, such as a computer, another type of device, or the like. That is, the processing and operations that were described in FIG. 3 to FIG. 10 may also be performed by the control unit 11 of the monitoring apparatus 1, or they may also be performed by the client apparatus 2.

Furthermore, they may also be performed by devices other than these, or the monitoring apparatus 1, the client apparatus 2, and the devices other than these may perform them together. Therefore, the image processing apparatus of the present embodiment includes the monitoring apparatus 1, the client apparatus 2, and devices other than these.

In addition, in the explanation, the external devices that configure the monitoring system of the above-described embodiments were made the external devices 3a, and 3b. However, the number of external devices does not matter as long as there is one or more.

In addition, at least one portion of the configuration of the monitoring apparatus 1 may also be realized using hardware. In a case in which this is realized by hardware, it is sufficient if, for example, dedicated circuits are automatically generated from a program for realizing each step on an FPGA (field programmable gate array) by using a predetermined compiler.

In addition, the processing may also be made such that gate array circuits are formed in the same manner as the FPGA, and are realized as hardware. In addition, they may also be realized by an ASIC (Application Specific Integrated Circuit).

While the present invention has been described with reference to exemplary embodiments, it is to be understood that the invention is not limited to the disclosed exemplary embodiments. The scope of the following claims is to be accorded the broadest interpretation to encompass all such modifications and equivalent structures and functions.

In addition, as a part or the whole of the control according to the embodiments, a computer program realizing the function of the embodiments described above may be supplied to the image processing apparatus through a network or various storage media. Then, a computer (or a CPU, an MPU, or the like) of the image processing apparatus may be configured to read and execute the program. In such a case, the program and the storage medium storing the program configure the present invention.

This application claims the benefit of Japanese Patent Application No. 2022-090359, filed on Jun. 2, 2022, which is hereby incorporated by reference herein in its entirety.

What is claimed is:

1. An image processing apparatus comprising:
   at least one processing circuit; and
   at least one memory that stores a computer-readable instruction for causing, when executed by the at least one processing circuit, the image processing apparatus to:
   control a display screen that performs superimposed display of information relating to an external device on a video image including the external device that has been captured by an image sensor; and
   determine whether an illuminator of the external device is in use or not, or whether an image recognition operation based on the video image is in progress or not;
   wherein when an instruction to make the illuminator of the external device light up or flash has been input, in a case in which the illuminator of the external device is in use, or an image recognition operation based on the video image is in progress, a screen for displaying predetermined specifying information in the vicinity of the external device is displayed on the display screen instead of making the illuminator light up or flash, and
   wherein the angle of view is changed such that the specifying information is displayed within a predetermined angle of view of the video image.

2. The image processing apparatus according to claim 1, wherein, in a case in which the illuminator is lit up, the illuminator is determined to be in use.

3. The image processing apparatus according to claim 1, wherein the specifying information includes information in which the color or brightness of the information relating to the external device has been changed.

4. The image processing apparatus according to claim 3, wherein the information relating to the external device includes at least one of a device number for the external device, a name of the external device, and a current value relating to an operational state of the external device.

5. The image processing apparatus according to claim 1, wherein the specifying information includes a predetermined icon or mark.

6. The image processing apparatus according to claim 1, wherein the screen for displaying the specifying information includes a screen that prompts the display of the specifying information.

7. The image processing apparatus according to claim 6, wherein the screen that prompts the display of the specifying information includes a screen that displays a warning.

8. The image processing apparatus according to claim 1, wherein when the instruction to make the illuminator of the external device light up or flash has been input, if the illuminator of the external device is not in use, or an image recognition operation based on the video image is not in progress, the illuminator is made to light up or flash.

9. The image processing apparatus according to claim 1, wherein the illuminator includes an indicator.

10. The image processing apparatus according to claim 1, wherein the illuminator includes an electric light.

11. An image processing method comprising:
    a control step for controlling a display screen that performs superimposed display of information relating to an external device on a video image including the external device that has been captured by an image sensor; and
    determining step for determining whether an illuminator of the external device is in use or not, or whether an image recognition operation based on the video image is in progress or not;
    wherein when an instruction to make the illuminator of the external device light up or flash has been input, in a case in which determining step determines that the illuminator of the external device is in use, or an image recognition operation based on the video image is in progress, the control step displays a screen for displaying predetermined specifying information in the vicinity of the external device on the display screen instead of making the illuminator light up or flash, and
    wherein the angle of view is changed such that the specifying information is displayed within a predetermined angle of view of the video image.

12. A non-transitory computer-readable storage medium configured to store a computer program comprising instructions for executing following processes:
    a control step for controlling a display screen that performs superimposed display of information relating to an external device on a video image including the external device that has been captured by an image sensor; and
    determining step for determining whether an illuminator of the external device is in use or not, or whether an image recognition operation based on the video image is in progress or not;
    wherein when an instruction to make the illuminator of the external device light up or flash has been input, in a case in which determining step determines that the illuminator of the external device is in use, or an image recognition operation based on the video image is in progress, the control step displays a screen for displaying predetermined specifying information in the vicinity of the external device on the display screen instead of making the illuminator light up or flash, and wherein the angle of view is changed such that the specifying information is displayed within a predetermined angle of view of the video image.

13. An image processing apparatus comprising:

at least one processing circuit; and at least one memory that stores a computer-readable instruction for causing, when executed by the at least one processing circuit, the image processing apparatus to:

control a display screen that performs superimposed display of information relating to an external device on a video image including the external device that has been captured by an image sensor; and determine whether an illuminator of the external device is in use or not, or whether an image recognition operation based on the video image is in progress or not;

wherein when an instruction to make the illuminator of the external device light up or flash has been input, in a case in which the illuminator of the external device is in use, or an image recognition operation based on the video image is in progress, a screen for displaying predetermined specifying information in the vicinity of the external device is displayed on the display screen instead of making the illuminator light up or flash, wherein when the instruction to make the illuminator of the external device light up or flash has been input, if the illuminator of the external device is not in use, or an image recognition operation based on the video image is not in progress, the illuminator is made to light up or flash.

14. The image processing apparatus according to claim 13, wherein, in a case in which the illuminator is lit up, the illuminator is determined to be in use.

15. The image processing apparatus according to claim 13, wherein the specifying information includes information in which the color or brightness of the information relating to the external device has been changed.

16. The image processing apparatus according to claim 15, wherein the information relating to the external device includes at least one of a device number for the external device, a name of the external device, and a current value relating to an operational state of the external device.

17. The image processing apparatus according to claim 13, wherein the specifying information includes a predetermined icon or mark.

18. The image processing apparatus according to claim 13, the angle of view is changed such that the specifying information is displayed within a predetermined angle of view of the video image.

19. The image processing apparatus according to claim 13, wherein the screen for displaying the specifying information includes a screen that prompts the display of the specifying information.

20. The image processing apparatus according to claim 19, wherein the screen that prompts the display of the specifying information includes a screen that displays a warning.

21. The image processing apparatus according to claim 13, wherein the illuminator includes an indicator.

22. The image processing apparatus according to claim 13, wherein the illuminator includes an electric light.

23. An image processing method comprising:

a control step for controlling a display screen that performs superimposed display of information relating to an external device on a video image including the external device that has been captured by an image sensor; and determining step for determining whether an illuminator of the external device is in use or not, or whether an image recognition operation based on the video image is in progress or not;

wherein when an instruction to make the illuminator of the external device light up or flash has been input, in a case in which determining step determines that the illuminator of the external device is in use, or an image recognition operation based on the video image is in progress, the control step displays a screen for displaying predetermined specifying information in the vicinity of the external device on the display screen instead of making the illuminator light up or flash, wherein when the instruction to make the illuminator of the external device light up or flash has been input, if the illuminator of the external device is not in use, or an image recognition operation based on the video image is not in progress, the illuminator is made light up or flash.

24. A non-transitory computer-readable storage medium configured to store a computer program comprising instructions for executing following processes:

a control step for controlling a display screen that performs superimposed display of information relating to an external device on a video image including the external device that has been captured by an image sensor; and determining step for determining whether an illuminator of the external device is in use or not, or whether an image recognition operation based on the video image is in progress or not;

wherein when an instruction to make the illuminator of the external device light up or flash has been input, in a case in which determining step determines that the illuminator of the external device is in use, or an image recognition operation based on the video image is in progress, the control step displays a screen for displaying predetermined specifying information in the vicinity of the external device on the display screen instead of making the illuminator light up or flash, wherein when the instruction to make the illuminator of the external device light up or flash has been input, if the illuminator of the external device is not in use, or an image recognition operation based on the video image is not in progress, the illuminator is made light up or flash.

* * * * *